United States Patent
Suzuki et al.

(10) Patent No.: US 9,667,141 B2
(45) Date of Patent: May 30, 2017

(54) SWITCHING POWER SUPPLY

(71) Applicant: YAZAKI CORPORATION, Tokyo (JP)

(72) Inventors: Shingo Suzuki, Shizuoka (JP); Michito Enomoto, Shizuoka (JP)

(73) Assignee: Yazaki Corporation, Minato-ku, Tokyo (JP)

(*) Notice: Subject to any disclaimer, the term of this patent is extended or adjusted under 35 U.S.C. 154(b) by 0 days.

(21) Appl. No.: 15/180,193

(22) Filed: Jun. 13, 2016

(65) Prior Publication Data

US 2016/0285370 A1  Sep. 29, 2016

Related U.S. Application Data

(63) Continuation of application No. PCT/JP2014/080230, filed on Nov. 14, 2014.

(30) Foreign Application Priority Data

Jan. 16, 2014 (JP) ................... 2014-005646

(51) Int. Cl.
*G05F 1/00* (2006.01)
*H02M 3/156* (2006.01)
*H02M 1/36* (2007.01)

(52) U.S. Cl.
CPC ............. *H02M 3/156* (2013.01); *H02M 1/36* (2013.01)

(58) Field of Classification Search
CPC .......... G05F 1/462; G05F 1/562; G05F 1/565; G05F 1/56; G05F 1/575; G05F 1/595;
(Continued)

(56) References Cited

U.S. PATENT DOCUMENTS

2005/0116692 A1  6/2005 Sugiyama
2007/0182396 A1  8/2007 Inatomi
(Continued)

FOREIGN PATENT DOCUMENTS

JP  2002-112573 A  4/2002
JP  2005-168169 A  6/2005
(Continued)

OTHER PUBLICATIONS

International Search Report for PCT/JP2014/080230 dated Jan. 27, 2015.

*Primary Examiner* — Adolf Berhane
*Assistant Examiner* — Gary Nash
(74) *Attorney, Agent, or Firm* — Sughrue Mion, PLLC

(57) ABSTRACT

A switching power supply includes: a switching type power supply circuit that converts an input voltage to generate an output voltage; and a control IC that executes feedback control that, based on a differential voltage between a target voltage and the output voltage from the power supply circuit, controls a switching element of the power supply circuit and causes the output voltage from the power supply circuit to converge to the target voltage. The control IC sets a this-time value of the target voltage based on a value obtained by adding a preset value to a previous value of the target voltage at a time of startup of the power supply circuit. Provided with this operation is a switching power supply that can precisely reduce an overshoot of the output voltage at the time of startup.

6 Claims, 3 Drawing Sheets

(58) Field of Classification Search
CPC ..... G05F 1/468; H02M 3/1588; H02M 3/157; H02M 3/156
USPC .......... 323/241, 274, 282–284, 901
See application file for complete search history.

(56) References Cited

U.S. PATENT DOCUMENTS

| | | | | |
|---|---|---|---|---|
| 2009/0167267 | A1* | 7/2009 | Dwarakanath | H02M 1/36 323/282 |
| 2010/0026262 | A1* | 2/2010 | Sase | H02M 3/156 323/283 |
| 2011/0260703 | A1* | 10/2011 | Laur | H02M 3/1563 323/271 |
| 2011/0291626 | A1* | 12/2011 | Murakami | H02M 3/156 323/271 |
| 2012/0091978 | A1 | 4/2012 | Ishii | |

FOREIGN PATENT DOCUMENTS

| | | |
|---|---|---|
| JP | 2007-215268 A | 8/2007 |
| JP | 2008-301581 A | 12/2008 |
| JP | 2012-060819 A | 3/2012 |
| JP | 2012-090387 A | 5/2012 |

* cited by examiner

SWITCHING POWER SUPPLY

CROSS-REFERENCE TO RELATED APPLICATION

This application is a continuation application of International Application PCT/JP2014/080230, filed on Nov. 14, 2014, and designating the U.S., the entire contents of which are incorporated herein by reference.

BACKGROUND OF THE INVENTION

1. Field of the Invention

The present invention relates to a switching power supply.

2. Description of the Related Art

Japanese Patent Application Laid-open No. 2008-301581 discloses a switching type DC-DC converter having a soft-start circuit as a conventional switching power supply, for example. This soft-start circuit, until an output voltage of the converter reaches a set voltage, compares a voltage by a capacitor for soft start and a dividing resistor for soft start with a reference voltage that is equal to a voltage by a dividing resistor for output voltage detection when the output voltage is the set voltage, and controls a duty period of an output transistor.

Although the switching type DC-DC converter having the soft-start circuit reduces an overshoot of the output voltage at startup by being configured as described above, a more precise overshoot reduction is demanded, for example.

SUMMARY OF THE INVENTION

The present invention has been made in view of the above circumstances, and an object thereof is to provide a switching power supply that can precisely reduce an overshoot of an output voltage at startup.

In order to achieve the above mentioned object, a switching power supply according to one aspect of the present invention includes a switching type power supply circuit configured to convert an input voltage to generate an output voltage; and a control integrated circuit configured to execute feedback control that, based on a differential voltage between a target voltage and the output voltage from the power supply circuit, controls a switching element of the power supply circuit and causes the output voltage from the power supply circuit to converge to the target voltage, wherein the control integrated circuit sets a this-time value of the target voltage based on a value obtained by adding a preset value to a previous value of the target voltage at a time of startup of the power supply circuit, the control integrated circuit sets a value obtained by adding the preset value to the output voltage as an initial value of the target voltage at the time of startup of the power supply circuit, and the output voltage immediately before start of the startup of the power supply circuit is a certain voltage and a voltage less than a predetermined final target voltage under influence of a load state of a load device connected to the power supply circuit.

According to another aspect of the present invention, in the switching power supply, it is possible to configure that the control integrated circuit makes the preset value variable.

According to still another aspect of the present invention, in the switching power supply, it is possible to configure that the control integrated circuit makes the preset value relatively larger when a differential voltage between a predetermined final target voltage and the output voltage is relatively larger, and makes the preset value relatively smaller when the differential voltage between the final target voltage and the output voltage is relatively smaller.

According to still another aspect of the present invention, in the switching power supply, it is possible to configure that the control integrated circuit fixes the target voltage to the final target voltage after the target voltage or the output voltage becomes a predetermined final target voltage.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes an embodiment according to the present invention in detail with reference to the accompanying drawings. The present invention is not limited by this embodiment. Components in the following embodiment include components that can easily be replaced by those skilled in the art or substantially the same components.

Embodiment

Figure 1:
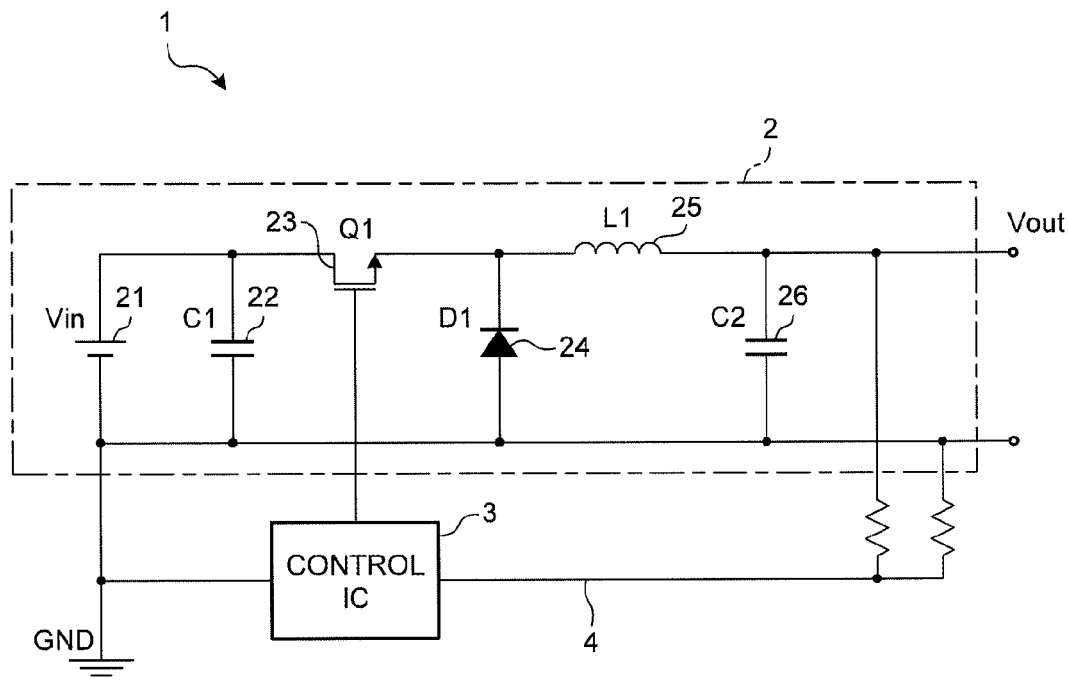
FIG. 1 is a configuration diagram illustrating a schematic configuration of a switching power supply according to an embodiment.
Figure 2:
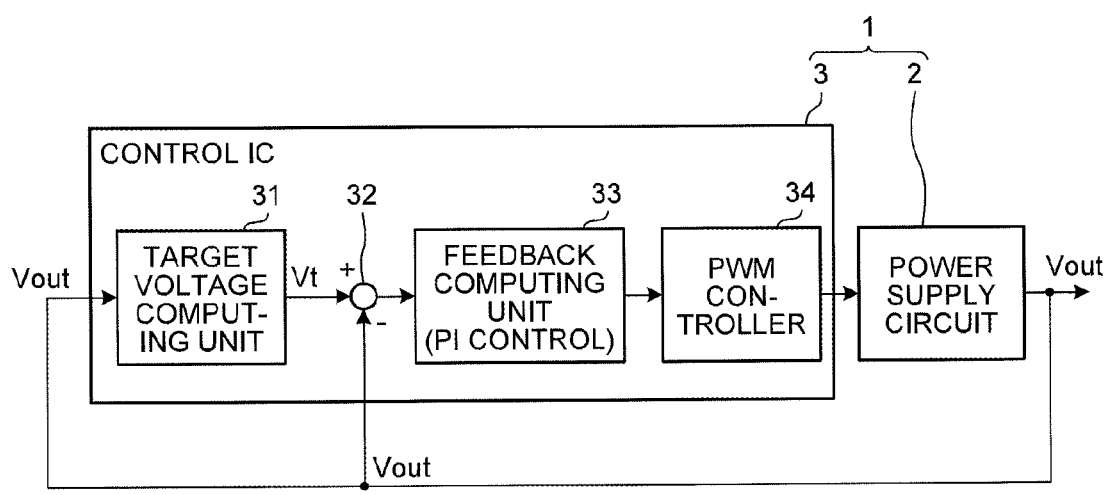
FIG. 2 is a block diagram illustrating an example of a schematic configuration of a control IC of the switching power supply according to the embodiment.
Figure 3:
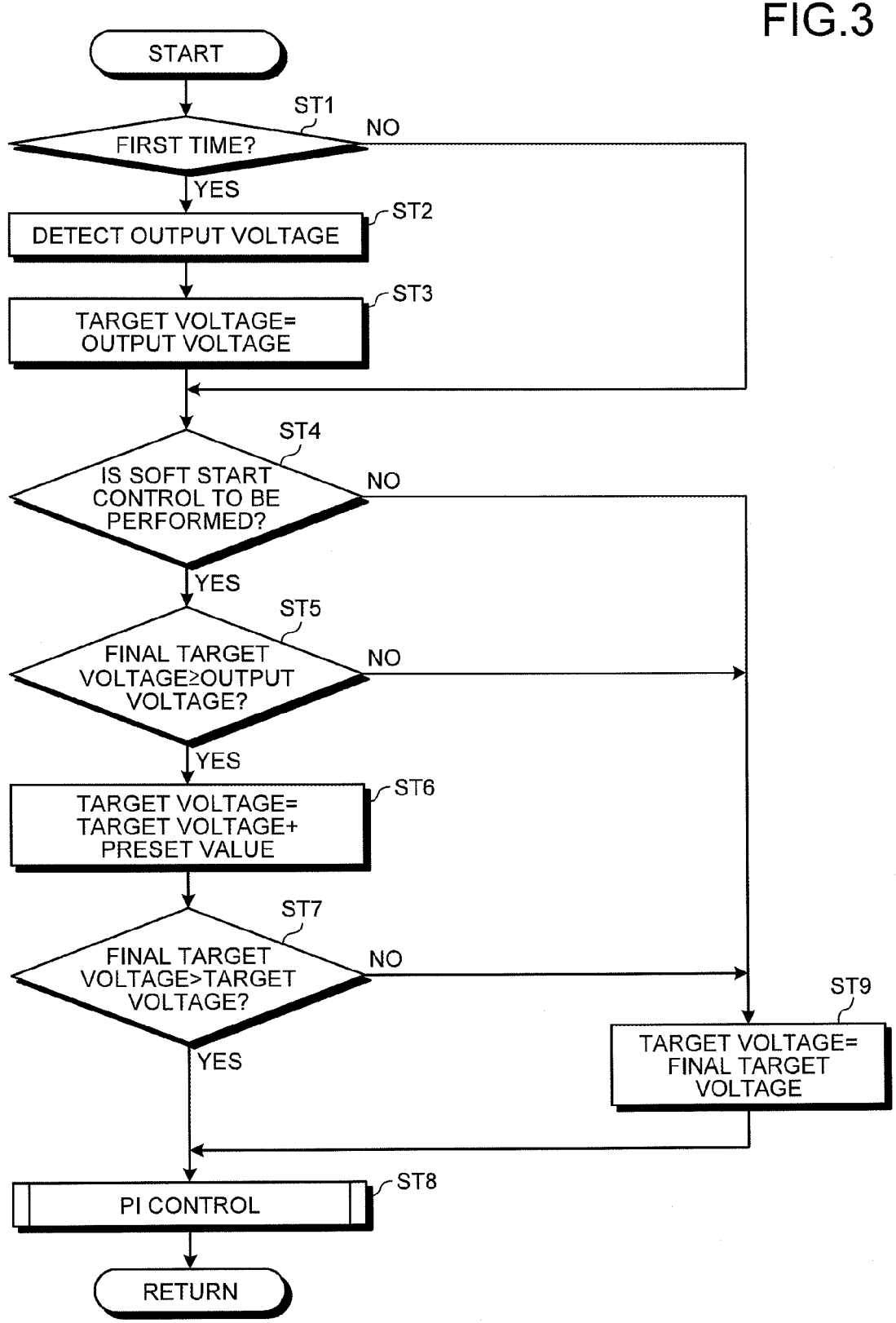
FIG. 3 is a flowchart illustrating an example of startup control by the control IC of the switching power supply according to the embodiment.
Figure 4:
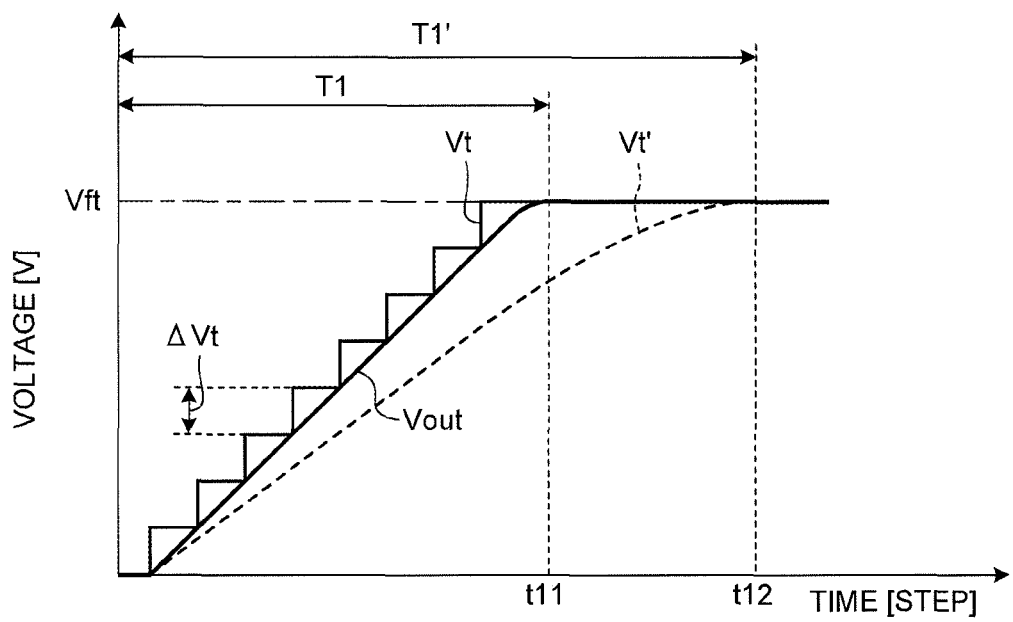
FIG. 4 is a diagram illustrating an example of an output voltage waveform when the startup control by the control IC of the switching power supply according to the embodiment is performed.

FIG. 1 is a configuration diagram illustrating a schematic configuration of a switching power supply according to the embodiment. FIG. 2 is a block diagram illustrating an example of a schematic configuration of a control IC of the switching power supply according to the embodiment. FIG. 3 is a flowchart illustrating an example of startup control by the control IC of the switching power supply according to the embodiment. FIG. 4 is a diagram illustrating an example of an output voltage waveform when the startup control by the control IC of the switching power supply according to the embodiment is performed.

The switching power supply 1 according to the embodiment illustrated in FIG. 1 includes a switching type power supply circuit 2 that converts an input voltage Vin to generate an output voltage Vout, and a control integrated circuit (IC) 3 that controls a switching element (a transistor 23) of the power supply circuit 2. This switching power supply 1 performs on/off control of the switching element of the power supply circuit 2 by the control IC 3, thereby generating and outputting a stable direct-current voltage from the power supply circuit 2.

The power supply circuit 2 of the present embodiment is a switching type step-down DC-DC converter circuit including a power supply 21, a capacitor (C1) 22, the transistor (Q1) 23 as the switching element, a diode (D1) 24, an inductor (L1) 25, and a capacitor (C2) 26. The power supply 21 is a direct-current power supply, in which a GND terminal is connected to a negative pole, and one end of the capacitor 22 and a drain terminal of the transistor 23 are connected to a positive pole. The capacitor 22 is a smoothing capacitor, in which the GND terminal is connected to the other end. The transistor 23 is an N-channel field effect transistor (FET), in which the positive pole of the power supply 21 is connected to the drain terminal as described above, a cathode of the diode 24 and one end of the inductor 25 are connected to a source terminal, and the control IC 3 is connected to a gate terminal. The diode 24 is a rectifying diode, in which the GND terminal is connected to an anode. To the other end of the inductor 25, one end of the capacitor 26 and an output terminal (an output terminal of the power supply circuit 2) to a load device (an electric instrument consuming electric power) are connected. The capacitor 26 is a smoothing capacitor, in which the GND terminal is connected to the other end. The control IC 3 controls a duty period (an ON period) of the transistor 23, whereby the power supply circuit 2 performs voltage conversion of the direct-current input voltage Vin applied by the power supply 21 into the direct-current output voltage Vout and outputs the output voltage Vout to the load device from the output terminal.

The control IC 3 controls a drive of the power supply circuit 2 and is an integrated circuit including an electronic circuit mainly including a well-known microcomputer including a CPU, a ROM, a RAM, and an interface. To the control IC 3, the GND terminal and the gate terminal of the transistor 23 are connected, the output terminal of the power supply circuit 2 is connected via a voltage detection line 4, and the output voltage Vout from the power supply circuit 2 is input. The control IC 3 performs feedback control that, based on a differential voltage between a target voltage Vt and the output voltage Vout from the power supply circuit 2, controls the transistor 23 as the switching element of the power supply circuit 2 and causes the output voltage Vout from the power supply circuit 2 to converge to the target voltage Vt. The control IC 3 computes a controlled variable of the transistor 23 based on the differential voltage between the target voltage Vt and the output voltage Vout, and controls the transistor 23 based on the controlled variable.

More specifically, the control IC 3 computes the differential voltage between the target voltage Vt and the output voltage Vout from the power supply circuit 2 input via the voltage detection line 4. The target voltage Vt is a voltage as a target of the output voltage Vout in the feedback control, which is typically determined in accordance with a voltage required by the load device connected to the power supply circuit 2 or the like and is variably set at the startup of the power supply circuit 2 as described below. The control IC 3 computes the controlled variable of the transistor 23 based on the computed differential voltage between the target voltage Vt and the output voltage Vout. The controlled variable of the transistor 23 is typically a duty period corresponding to the length of the on period of the transistor 23 as the switching element. The output voltage Vout of the power supply circuit 2 becomes relatively larger as the duty period becomes relatively longer and becomes relatively smaller as the duty period becomes relatively shorter. The control IC 3 computes the duty period as the controlled variable of the transistor 23 so that the computed differential voltage between the target voltage Vt and the output voltage Vout will be smaller (that is, so that the output voltage Vout will converge to the target voltage Vt) by what is called P control, PI control, or PID control. The control IC 3 stores a controlled variable map (or a mathematical model) and the like that specifies a correspondence relation between the differential voltage between the target voltage Vt and the output voltage Vout and the duty period as the controlled variable of the transistor 23 in a storage unit and computes the duty period as a target of control from the differential voltage between the target voltage Vt and the output voltage Vout using the controlled variable map, for example. Specifically, the control IC 3 makes the duty period relatively longer as the differential voltage between the target voltage Vt and the output voltage Vout becomes relatively larger and makes the duty period relatively shorter as the differential voltage becomes relatively smaller. Based on the computed duty period, the control IC 3 generates a pulse-width-modulated PWM signal (a pulse signal) and outputs the PWM signal to the transistor 23 and performs on/off control of the transistor 23 so that the output voltage Vout will converge to the target voltage Vt.

The control IC 3 of the present embodiment performs setting so as to increase the target voltage Vt in stages at the time of startup of the power supply circuit 2 and can thereby precisely reduce an overshoot of the output voltage Vout at the startup of the power supply circuit 2.

At the time of startup of the power supply circuit 2 is typically a period from a point in time when a startup signal of the power supply circuit 2 is input to the switching power supply 1 or a preset startup condition is satisfied, whereby the startup of the power supply circuit 2 is started, to a point in time when the output voltage Vout of the power supply circuit 2 converges to a predetermined final target voltage Vft. The final target voltage Vft is set as a fixed value in advance in accordance with the voltage required by the load device connected to the power supply circuit 2 and is stored in the storage unit.

Specifically, the control IC 3 sets a this-time value of the target voltage Vt based on a value obtained by adding a preset value ΔVt to a previous value of the target voltage Vt at the startup of the power supply circuit 2. The this-time value of the target voltage Vt is typically the target voltage Vt used in the present control period, whereas the previous value of the target voltage Vt is the target voltage Vt used in a past control period previous to the present control period. An initial value of the target voltage Vt may be zero and preferably uses a value obtained by adding the preset value ΔVt to the output voltage Vout at the start of startup, for example. The control IC 3 of the present embodiment sets the value obtained by adding the preset value ΔVt to the output voltage Vout as the initial value of the target voltage Vt at the startup of the power supply circuit 2. The preset value ΔVt is a value freely set in advance. The overshoot of the output voltage Vout at startup tends to occur when the duty period corresponding to the length of the on period of the transistor 23 is relatively longer. In consideration of this point, the preset value ΔVt is set in advance based on an experiment or the like as a value that does not cause the overshoot owing to an excessively long duty period and is stored in the storage unit. In this example, the preset value ΔVt is a fixed value.

The control IC 3 of the present embodiment fixes the target voltage Vt to the final target voltage Vft after the target voltage Vt or the output voltage Vout reaches the final target voltage Vft. In other words, the control IC 3 sets the target voltage Vt to the value obtained by adding the preset value ΔVt to the output voltage Vout when the output voltage Vout is the final target voltage Vft or less and when the value obtained by adding the preset value ΔVt to the output voltage Vout is less than the final target voltage Vft at the startup of the power supply circuit 2.

The following describes an example of a schematic configuration of the control IC 3 of the present embodiment with reference to the block diagram in FIG. 2.

As illustrated in FIG. 2, the control IC 3 is configured to include a target voltage computing unit 31, a subtracting unit 32, a feedback computing unit 33, and a PWM controller 34 in terms of functional concepts.

The target voltage computing unit 31 computes the target voltage Vt. The target voltage computing unit 31 sets the this-time value of the target voltage Vt based on the value obtained by adding the preset value ΔVt to the previous value of the target voltage Vt at the startup of the power supply circuit 2. The target voltage computing unit 31 sets the initial value of the target voltage Vt based on the output voltage Vout at the start of startup. To the target voltage computing unit 31, the output voltage Vout from the power supply circuit 2 is input via the voltage detection line 4. The target voltage computing unit 31 detects the output voltage Vout at the start of the startup (immediately before the start of the startup) of the power supply circuit 2 and checks the state of the output voltage Vout. The output voltage Vout at the start of the startup (immediately before the start of the startup) of the power supply circuit 2 is not limited to 0 V and may be a certain voltage under the influence of a load state of the load device connected to the power supply circuit 2, for example. However, the output voltage Vout at the start of the startup (immediately before the start of the startup) of the power supply circuit 2 is typically less than the final target voltage Vft. The target voltage computing unit 31 sets the value obtained by adding the preset value ΔVt to the output voltage Vout at the start of startup as the initial value of the target voltage Vt at the start of the power supply circuit 2. After the target voltage Vt or the output voltage Vout reaches the final target voltage Vft, the target voltage computing unit 31 fixes the target voltage Vt to the final target voltage Vft. The target voltage computing unit 31 outputs the target voltage Vt that has been computed and set to the subtracting unit 32.

The subtracting unit 32 computes the differential voltage between the target voltage Vt and the output voltage Vout. To the subtracting unit 32, the target voltage Vt is input from the target voltage computing unit 31, and the output voltage Vout from the power supply circuit 2 is input via the voltage detection line 4. The subtracting unit 32 computes the differential voltage between the input target voltage Vt and output voltage Vout and outputs the computed differential voltage to the feedback computing unit 33.

The feedback computing unit 33 computes the controlled variable (a feedback controlled variable) of the transistor 23 based on the differential voltage between the target voltage Vt and the output voltage Vout. To the feedback computing unit 33, the differential voltage between the target voltage Vt and the output voltage Vout is input from the subtracting unit 32. The feedback computing unit 33 computes the duty period as the controlled variable of the transistor 23 so that, based on the differential voltage between the input target voltage Vt and output voltage Vout, the differential voltage will be smaller by P control, PI control, or PID control (PI control as an example in this example). The feedback computing unit 33 outputs a signal corresponding to the computed duty period to the PWM controller 34.

The PWM controller 34 actually performs on/off control of the transistor 23 in accordance with the duty period as the controlled variable of the transistor 23. To the PWM controller 34, the signal corresponding to the duty period as the controlled variable of the transistor 23 is input from the feedback computing unit 33. The PWM controller 34 generates a PWM signal pulse-width-modulated based on the input signal corresponding to the duty period, outputs the PWM signal to the transistor 23, and performs on/off control of the transistor 23 so that the output voltage Vout will converge to the target voltage Vt.

Next, the following describes an example of startup control of the power supply circuit 2 by the control IC 3 with reference to the flowchart in FIG. 3. These control routines are repeatedly executed at a control period (in units of clocks) of a few milliseconds to a few tens of milliseconds.

First, when the startup signal of the power supply circuit 2 is input or the preset startup condition is satisfied, whereby the startup of the power supply circuit 2 is started, the target voltage computing unit 31 of the control IC 3 determines whether a this-time control period is the first control period at startup, in other words, whether it is the first target voltage setting (Step ST1). If it is determined that the this-time control period is not the first time (No at Step ST1), the target voltage computing unit 31 performs the processing at Step ST4 skipping Step ST2 and Step ST3.

If it is determined that the this-time control period is the first time (Yes at Step ST1), the target voltage computing unit 31 detects the present output voltage Vout (Step ST2).

Next, the target voltage computing unit 31 temporarily sets the present output voltage Vout detected at Step ST2 as the target voltage Vt (Step ST3).

Next, the target voltage computing unit 31 determines whether soft start control, that is, control to perform setting so as to increase the target voltage Vt in stages is to be performed at the startup of the power supply circuit 2 (Step ST4). The target voltage computing unit 31 may determine the necessity of the soft start control in accordance with an operating state of the entire switching power supply 1, the load state of the load device connected to the power supply circuit 2, or the like, for example; it is basically determined that the soft start control is necessary in this example.

If it is determined that the soft start control is performed (Yes at Step ST4), the target voltage computing unit 31 determines whether the present output voltage Vout is the predetermined final target voltage Vft or less (Step ST5).

If it is determined that the present output voltage Vout is the final target voltage Vft or less (Yes at Step ST5), the target voltage computing unit 31 computes a value obtained by adding the predetermined preset value ΔVt to the present target voltage Vt and temporarily sets this value as the this-time value of the target voltage Vt (Step ST6). In this case, when the present control period is the first control period at the startup, the target voltage computing unit 31 temporarily sets the target voltage Vt as the output voltage Vout at Step ST3, and consequently, the initial value of the target voltage Vt is the value obtained by adding the preset value ΔVt to the output voltage Vout. The target voltage Vt after the first time is the value obtained by adding the preset value ΔVt to the previous value of the target voltage Vt.

Next, the target voltage computing unit 31 determines whether the target voltage Vt computed at Step ST6 is less than the final target voltage Vft (Step ST7).

If it is determined that the target voltage Vt computed at Step ST6 by the target voltage computing unit 31 is less than the final target voltage Vft (Yes at Step ST7), the control IC 3 executes PI control of the transistor 23 based on the presently set target voltage Vt, which is the value obtained by adding the preset value ΔVt to the previous value of the target voltage Vt (the value obtained by adding the preset value ΔVt to the output voltage Vout in the first time) in this example (Step ST8), ends the present control period, and shifts to the next control period. In this case, the subtracting unit 32 of the control IC 3 computes a differential voltage between the presently set target voltage Vt and the output voltage Vout. The feedback computing unit 33 of the control IC 3 computes the duty period as the controlled variable of the transistor 23 based on the differential voltage. The PWM controller 34 of the control IC 3 outputs the PWM signal pulse-width-modulated based on the duty period to the transistor 23 and performs on/off control of the transistor 23.

If it is determined that the soft start control is not to be performed at Step ST4 (No at Step ST4), if it is determined that the present output voltage Vout is larger than the final target voltage Vft at Step ST5 (No at Step ST5), or if it is determined that the target voltage Vt computed at Step ST6 is the final target voltage Vft or more at Step ST7 (No at Step ST7), the target voltage computing unit 31 fixes the target voltage Vt to the final target voltage Vft (Step ST9) and performs the processing at Step ST8. In this case, the control IC 3 executes PI control of the transistor 23 based on the presently set target voltage Vt, or the final target voltage Vft in this example.

FIG. 4 illustrates an example of an output voltage waveform when the above startup control is performed by the control IC 3. In FIG. 4, the horizontal axis is a time axis by the control period (Time [STEP]), and the vertical axis is a voltage (Voltage [V]).

As illustrated in FIG. 4, the switching power supply 1 configured as described above is set so that the target voltage Vt will increase in stages by each control period by the control IC 3 at the startup of the power supply circuit 2. In the switching power supply 1 of the present embodiment, the value obtained by adding the preset value ΔVt to the previous value of the target voltage Vt is set as the this-time value of the target voltage Vt by the control IC 3 at the startup of the power supply circuit 2. With this operation, the switching power supply 1 can prevent the differential voltage between the target voltage Vt and the output voltage Vout from being extremely large at the startup of the power supply circuit 2. As a result, the switching power supply 1 can make the duty period required by the transistor 23 at the startup of the power supply circuit 2 relatively shorter. Consequently, the switching power supply 1 can prevent a phenomenon in which the output voltage Vout is extremely large relative to the target voltage Vt, that is, the overshoot from occurring at the startup of the power supply circuit 2. After the target voltage Vt is fixed to the final target voltage Vft, the output voltage Vout converges to the target voltage Vt at a point in time t11, and the startup of the power supply circuit 2 completes, whereby the switching power supply 1 can output a stable output voltage Vout.

The switching power supply 1 of the present embodiment sets the value obtained by adding the preset value ΔVt to the previous value of the target voltage Vt as the this-time value of the target voltage Vt at the startup of the power supply circuit 2, whereby even when the output voltage Vout temporarily decreases owing to a sudden rise of the load of the load device connected to the power supply circuit 2 or the like, an increase amount of the target voltage Vt per unit time can be made constant regardless of fluctuations of the output voltage Vout, for example. Consequently, the switching power supply 1 can make a startup time T1 of the power supply circuit 2, which is a period from the point in time when the startup of the power supply circuit 2 is started to the point in time t11 when the output voltage Vout of the power supply circuit 2 converges to the target voltage Vt (=the final target voltage Vft), substantially constant and can prevent variations in the time from the start of startup to the completion of startup from occurring. A target voltage Vt' corresponds to the target voltage (the reference voltage) of the above conventional technique. In this case, variations in a startup time T1' occur, and consequently, there is a risk that a preset desired startup time may be exceeded (refer to a point in time t12). The switching power supply 1 of the present embodiment can make the startup time T1 substantially constant as described above, whereby the excess of the starting time or the like can be prevented. The switching power supply 1 can appropriately start up the power supply circuit 2 even when the load of the load device connected to the power supply circuit 2 is extremely large.

The switching power supply 1 can set the value obtained by adding the preset value ΔVt based on the present output voltage Vout as the initial value of the target voltage Vt at the initial stage of startup, whereby rising of the target voltage Vt and the output voltage Vout at the initial stage of startup can be improved.

The switching power supply 1 of the present embodiment controls the duty period that the transistor 23 is requested to exhibit by the computation in the control IC 3 to perform startup control of the power supply circuit 2 as described above and can thereby reduce the influence of parts characteristic variations compared with a case in which similar functionality is achieved by an analog circuit, for example, whereby the overshoot of the output voltage Vout at the startup of the power supply circuit 2 can precisely be reduced. The switching power supply 1 can reduce the number of components compared with a case in which similar functionality is achieved by an analog circuit, for example, and can thereby reduce a component mounting area and miniaturize the device.

The switching power supply 1 described above includes the switching type power supply circuit 2 that converts the input voltage Vin to generate the output voltage Vout and the control IC 3 that executes feedback control that, based on the differential voltage between the target voltage Vt and the output voltage Vout from the power supply circuit 2, controls the transistor 23 of the power supply circuit 2 and causes the output voltage Vout from the power supply circuit 2 to converge to the target voltage Vt. The control IC 3 sets the this-time value of the target voltage Vt based on the value obtained by adding the preset value ΔVt to the previous value of the target voltage Vt at the startup of the power supply circuit 2. Consequently, the switching power supply 1 performs startup control of the power supply circuit 2 by the computation in the control IC 3, whereby the influence of parts characteristic variations can be reduced, and the overshoot of the output voltage Vout can precisely be reduced at the startup of the power supply circuit 2. Consequently, the switching power supply 1 can improve reliability. The switching power supply 1 sets the this-time value of the target voltage Vt based on the value obtained by adding the preset value ΔVt to the previous value of the target voltage Vt, and the startup time of the power supply circuit 2 can be stabilized, whereby the startup performance can be made constant. Even when the load of the load device connected to the power supply circuit 2 is extremely large, the switching power supply 1 can appropriately start up the power supply circuit 2.

Furthermore, in the switching power supply 1 described above, the control IC 3 sets the value obtained by adding the preset value ΔVt to the output voltage Vout as the initial value of the target voltage Vt at the startup of the power supply circuit 2. Consequently, the switching power supply 1 can improve the rising of the target voltage Vt and the output voltage Vout at the initial stage of startup and quickly start up the power supply circuit 2.

Furthermore, in the switching power supply 1 described above, after the target voltage Vt or the output voltage Vout reaches the predetermined final target voltage Vft, the control IC 3 fixes the target voltage Vt to the final target voltage Vft. Consequently, the switching power supply 1 can output a stable output voltage Vout after the output voltage Vout converges to the target voltage Vt (the final target voltage Vft). Even when, in relation to the final target voltage Vft, the preset value ΔVt is not set to magnitude that makes the this-time value of the target voltage Vt specified by the sum of the previous value of the target voltage Vt and the preset value ΔVt exactly match the final target voltage Vft, and the target voltage Vt specified by the sum of the previous value of the target voltage Vt and the preset value ΔVt exceeds the final target voltage Vft, for example, the switching power supply 1 can fix the target voltage Vt to the final target voltage Vft when the target voltage Vt is about to exceed the final target voltage Vft. Also in this regard, the switching power supply 1 can reliably output a stable output voltage Vout.

The switching power supply according to the embodiment of the present invention described above is not limited to the embodiment described above, and various alterations can be made within the scope described in the claims.

Although the control IC 3 is described with the preset value ΔVt as a fixed value in the above description, the preset value ΔVt may be variable. The control IC 3 may alter the preset value ΔVt based on an external environment of the switching power supply 1, a load condition of the load device connected to the power supply circuit 2, or the like, for example. The control IC 3 can also freely set the startup time of the power supply circuit 2 by appropriately altering this preset value ΔVt, for example. In other words, the control IC 3 can freely set the startup time by freely altering the preset value ΔVt in accordance with a desired startup time. In other words, this switching power supply 1 can easily alter the startup time of the power supply circuit 2 to a desired time by altering the preset value ΔVt in terms of software, whereby manufacturing costs can also be reduced.

Figure 5:
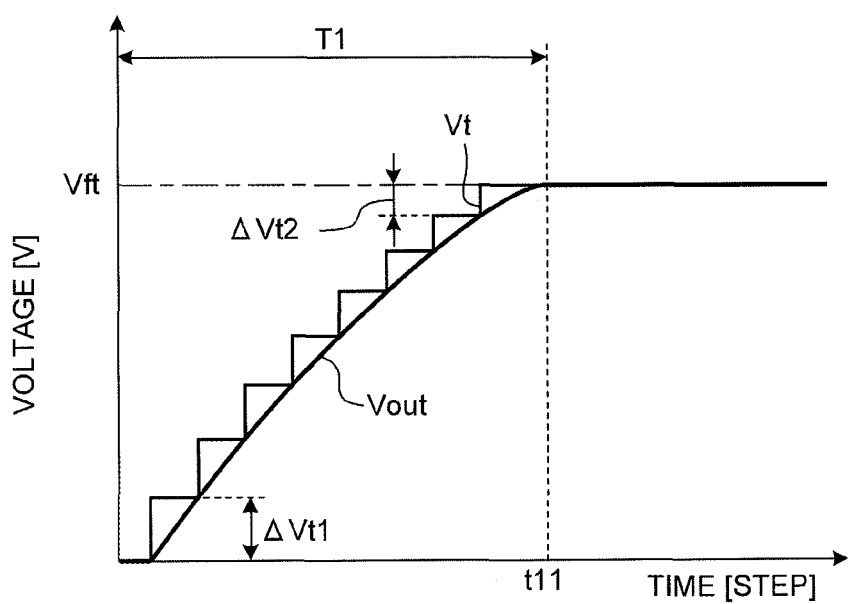
FIG. 5 is a diagram illustrating an example of an output voltage waveform when startup control by a control IC of a switching power supply according to a modification is performed.

FIG. 5 is a diagram illustrating an example of an output voltage waveform when startup control by a control IC of a switching power supply according to a modification is performed.

The control IC 3 of the switching power supply 1 according to the present modification computes and sets the preset value ΔVt based on a differential voltage between the final target voltage Vft and the output voltage Vout as an example. As illustrated in FIG. 5, the target voltage computing unit 31 of the control IC 3 according to the present modification makes the preset value ΔVt relatively larger when the differential voltage between the final target voltage Vft and the output voltage Vout is relatively larger and makes the preset value ΔVt relatively smaller when the differential voltage is relatively smaller. In this example, the target voltage computing unit 31 sets a preset value ΔVt2 immediately before the completion of startup at which the differential voltage between the final target voltage Vft and the output voltage Vout is relatively smaller to a value smaller than a preset value ΔVt1 at the initial stage of startup at which the differential voltage is relatively larger. In this case, the target voltage computing unit 31 may make the preset value ΔVt in the period from the preset value ΔVt1 to the preset value ΔVt2 decrease in stages based on the differential voltage between the final target voltage Vft and the output voltage Vout.

In this case, the switching power supply 1 can alter the way the target voltage Vt and the output voltage Vout rise with the startup time being constant by making the preset value ΔVt variable as described above with the number of times of control periods [STEP] required until the completion of startup being constant, for example. In the above case, the switching power supply 1 according to the modification can make the preset value ΔVt at the initial stage of startup (ΔVt1) relatively larger to the extent that no overshoot occurs and make the preset value ΔVt immediately before the completion of startup (ΔVt2) relatively smaller, whereby the overshoot can reliably be reduced while improving the rising of the output voltage Vout. The switching power supply 1 can also perform variable setting of the preset value ΔVt as described above with the number of times of control periods [STEP] required until the completion of startup changed, in other words, with the startup time changed.

Although described as the switching type step-down DC-DC converter circuit in the above description, the power supply circuit 2 is not limited to this example and may be a switching type step-up DC-DC converter circuit or another circuit including a switching element, for example. Although described as including the power supply 21 as a direct-current power supply, the power supply circuit 2 is not limited to this example, may include an input terminal to which the input voltage Vin is supplied from another power supply circuit in place of the power supply 21, and may be incorporated into part of an AC-DC converter circuit, for example.

Other than the preset value ΔVt, this switching power supply 1 can also alter the final target voltage Vft, the controlled variable map that specifies the correspondence relation between the differential voltage between the target voltage Vt and the output voltage Vout and the duty period as the controlled variable of the transistor 23, a feedback gain used in P control, PI control, PID control, or the like, and change characteristics of current and voltage, for example, in terms of software and can thereby make fine adjustments easily.

The switching power supply according to the present invention performs startup control of the power supply circuit by the computation in the control IC, thereby producing the effect of reducing the influence of parts characteristic variations and precisely reducing the overshoot of the output voltage at startup, for example.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A switching power supply comprising:
    a switching type power supply circuit configured to convert an input voltage to generate an output voltage; and
    a control integrated circuit configured to execute feedback control that, based on a differential voltage between a target voltage and the output voltage from the power supply circuit, controls a switching element of the power supply circuit and causes the output voltage from the power supply circuit to converge to the target voltage, wherein the control integrated circuit sets a this-time value of the target voltage based on a first value obtained by adding a preset value to a previous value of the target voltage at a time of startup of the power supply circuit, the control integrated circuit sets a second value obtained by adding the preset value to the output voltage as an initial value of the target voltage at the time of startup of the power supply circuit, and the output voltage immediately before start of the startup of the power supply circuit is a certain voltage and a voltage less than a predetermined final target voltage under influence of a load state of a load device connected to the power supply circuit.

2. The switching power supply according to claim 1, wherein the control integrated circuit makes the preset value variable.

3. The switching power supply according to claim 2, wherein the control integrated circuit makes the preset value relatively larger when a differential voltage between a predetermined final target voltage and the output voltage is relatively larger, and makes the preset value relatively smaller when the differential voltage between the final target voltage and the output voltage is relatively smaller.

4. The switching power supply according to claim 3, wherein the control integrated circuit fixes the target voltage to the final target voltage after the target voltage or the output voltage becomes a predetermined final target voltage.

5. The switching power supply according to claim 2, wherein the control integrated circuit fixes the target voltage to the final target voltage after the target voltage or the output voltage becomes a predetermined final target voltage.

6. The switching power supply according to claim 1, wherein the control integrated circuit fixes the target voltage to the final target voltage after the target voltage or the output voltage becomes a predetermined final target voltage.

* * * * *